United States Patent [19]

Sorenson

[11] 4,105,722

[45] Aug. 8, 1978

[54] LIGHTWEIGHT, CLOSED-CELL FOAM ELASTOMERIC ELEMENTS FOR USE IN COUNTERCURRENT GAS-LIQUID CONTACT OPERATIONS

[75] Inventor: Paul H. Sorenson, Fairfield, Conn.

[73] Assignee: Universal Oil Products Company, Des Plaines, Ill.

[21] Appl. No.: 816,065

[22] Filed: Jul. 15, 1977

Related U.S. Application Data

[63] Continuation of Ser. No. 562,603, Mar. 27, 1975, abandoned.

[51] Int. Cl.$^2$ ............................................... B01F 3/04
[52] U.S. Cl. ........................................ 261/94; 55/91; 261/DIG. 72; 264/54; 264/55
[58] Field of Search ................... 261/94–98, 261/112, 113, DIG. 72; 55/91, 94, 97, 90; 210/150, 151; 264/54, 55; 273/30, 58 B, 61 A

[56] References Cited

U.S. PATENT DOCUMENTS

| | | | |
|---|---|---|---|
| 2,400,810 | 5/1946 | Clarke et al. | 261/94 |
| 2,525,965 | 10/1950 | Smith | 264/55 |
| 2,570,182 | 10/1951 | Daly et al. | 264/55 |
| 2,743,931 | 5/1956 | Pooley et al. | 264/55 X |
| 2,763,475 | 9/1956 | Dennis | 261/97 X |
| 3,122,594 | 2/1964 | Kielback | 55/91 X |
| 3,350,075 | 10/1967 | Douglas | 55/91 X |
| 3,364,656 | 1/1968 | Whiton et al. | 261/DIG. 72 |
| 3,445,182 | 5/1969 | Tomany | 261/94 X |
| 3,768,234 | 10/1973 | Hardison | 55/91 X |
| 3,855,378 | 12/1974 | Topcik | 264/54 |
| 3,857,915 | 12/1974 | Crowley | 264/54 X |
| 3,911,066 | 10/1975 | Ireland, Jr. et al. | 261/94 |

*Primary Examiner*—Richard L. Chiesa
*Attorney, Agent, or Firm*—James R. Hoatson, Jr.; Philip T. Liggett; Barry L. Clark

[57] ABSTRACT

The use of lightweight, elastomeric closed-cell foam elements can be of particular advantage in countercurrent flow gas-liquid contactors in order to provide aeratable non-breakable forms of mobile contacting surfaces. In particular, the use of elastomeric, spherical form, closed-cell foam elements made from heating and post curing a blend of nitrile polymer and polyvinyl chloride can provide resilience to preclude sphere breakage and also provide for softness and flexibility to effect self-cleaning characteristics.

5 Claims, No Drawings

LIGHTWEIGHT, CLOSED-CELL FOAM ELASTOMERIC ELEMENTS FOR USE IN COUNTERCURRENT GAS-LIQUID CONTACT OPERATIONS

This is a continuation of Application Ser. No. 562,603, filed Mar. 27, 1975 now abandoned.

The present invention relates to an improved flexible and resilient form of lightweight contact element suitable for mobile, aerated usage in countercurrent gas-liquid contacting operations.

Also, and in a more specific aspect, the present invention is directed to the use of resulting lightweight types of closed-cell foam elements that are soft and spongy (and which can be made from a blend of nitrile polymer and polyvinyl chloride thermoplastic resins) to provide for improved floating bed types of gas scrubbing operations.

BACKGROUND OF THE INVENTION

It is realized that there are many types of gas-liquid contacting operations presently employed in connection with various petroleum and chemical processing systems, as well as various types being provided for the scrubbing of power plant stack gases and other contaminated gaseous streams to prevent air pollution. Also, in connection with certain types of gas scrubbing operations it has been found advantageous to make use of one or more stages of lightweight mobile elements to provide contacting surfaces and effect enhanced mixing for the countercurrently flowing streams. For example, two different, but related, types of "floating bed" scrubbers make use of lightweight mobile elements in one or more spaced beds to provide improved particle removal and/or gas scrubbing operations. A U.S. Pat. No. 3,122,594, issued to A. W. Kielback, teaches the utilization of the lightweight elements in one or more vertically spaced zones of a contact chamber where the upward gas flow causes the bed of elements to float and be lifted against an upper perforate barrier where they will move and rotate from the stream flows. In U.S. Pat. No. 3,350,075, issued to H. R. Douglas, there is disclosed a gas-liquid contacting operation with less resistance to gas flow where the lightweight floating elements will provide a more turbulent, random movement between more widely spaced perforate barrier means, as compared to the more compact bed of Kielback.

Commercial installations for both of the aforedescribed contacting systems have customarily utilized lightweight hollow spheres of polyethylene and polypropylene that are about 1½ inches in diameter and thus like the well-known "ping-pong" ball. Unfortunately, these balls are rather brittle and non-deformable so as to be subject to rapid loss of usefulness by reason of abrasion wear and breakage. The wear is particularly fast in scrubbers for flue gas streams containing fly ash and/or where limestone has been added to the liquid stream to serve as an adsorbent for $SO_2$ removal from the gaseous stream. The cracking of contact elements results from embrittlement and from their impact against walls and grids of the scrubber, as well as against each other, and it frequently occurs at the seams which are formed during their blow-molding manufacturing procedures. Over a period of time there can also be sufficient abrasion to the thin wall of a sphere so as to cause the development of a small hole which can lead to the hollow element being filled with liquid such that it can no longer float in a desired aerated or random type of movement. Inasmuch as the shutting down of a large flue gas scrubber in a clean-up system or a contact tower in a processing plant can be highly uneconomical and/or lead to air pollution problems, it has become necessary to find better and longer life contact elements for these various scrubbing, adsorbing, or processing systems. The aforementioned patents suggest other materials for the contact elements, e.g. foamed plastics or other porous materials; however, there can be problems with most of these types of materials and it has been expedient up to the present time to primarily use the hollow polypropylene or polyethylene spheres.

In connection with research work carried out to obtain better elements, the recent test work has shown that the relatively hard, non-deformable and non-flexible materials tend to wear and break faster by shattering or by mold seam cracking than the more elastic or rubber-like materials. Thus, it may be considered a principal object of the present invention to utilize lightweight, floatable elements of a rubber-like elastomeric material in order to obtain greater wear resistance and longer life to such elements in countercurrent gas-liquid operations.

A further object of the invention is to provide lightweight, aeratable contact elements which comprise a soft, spongy and closed-cell type of elastomeric material. The spongy and elastomer properties for the resulting post cured foam elements of the present invention will have deformability and flexibility which will permit such elements to, in turn, flex and result in a continuous or periodic removal of solids materials which may tend to adhere to the surfaces of the elements. As an additional aspect, it is an object of the invention to provide lightweight elements with small closed-cells so as to substantially preclude the absorption of water or other scrubbing liquor and any loss in mobility for the elements, as well as provide the advantage of continuous wearability, as will be more fully set forth hereinafter.

In still another aspect, it may be considered a further object of the invention to provide for the use of a lightweight "solid" sphere of a closed-cell foam such that the need of a blow-molding procedure is obviated. Also, preferably, the foam spheroid will be formed from a blend which will provide "self-skinning", with a resulting relatively tough, smooth, surface that will enhance the wearability of the element in operating service. However, in the event that the tough "self-skinned" surface does wear away, by providing a lightweight closed-cell foam element, where there are quite small closed cells and a general uniformity throughout the full cross-section of a sphere, there can be the uniform wearing away of the entire surface of an element without the problem of breakage and/or any harmful liquid absorption. Actually, in a final stage of useful life there can be merely a gradual loss in weight for an element and no harm to the overall "floating bed" scrubbing operation with the multiplicity of mobile contact surfaces.

Inasmuch as contact towers for processing operations and/or for flue gas scrubbing may well contain chemically aggressive components, as well as the abrasive materials, it is generally necessary to have good chemical resistance as a desired property for a contact element. Chemical resistance should be for acids as well as bases. For example, the reactants in a gaseous stream to be scrubbed may comprise sulfur oxides, carbon dioxides, nitrogen oxides, etc., such that there may be sulfuric acid, nitric acid, hydrochloric acid, and the like, along with additive components such as lime, limestone, Dolomite, zinc oxide and gypsum. Entrained particulates and additive compounds can also result in the forming of calcium carbonate, calcium sulfate, calcium sulfite, and the like. In any event, it is to be emphasized that in certain processing and scrubbing operations, the chemical attack on the contact elements can be quite severe as well as abrasive. In still another aspect, it is, of course, desirable to have oxidation resistance for the contact elements to overcome the continuous presence of gaseous oxygen and/or ozone.

In one embodiment, the present invention provides in connection with a method for the mutual contacting of countercurrently flowing gas and liquid streams, where lightweight mobile elements are used in the contact zone for providing contact surfaces, the improvement which comprises effecting such countercurrent contacting of the streams in the presence of a mass of aeratable, spheroidal-form, contact elements that are of a lightweight, closed-cell elastomeric foam formed from the molding and post curing of a blend comprising a nitrile polymer and polyvinyl chloride, together with a blowing agent.

In another embodiment, the present invention provides for a lightweight elastomeric contact element for providing a resilient wearable surface in a gas-liquid contacting operation, which comprises, a spheroidal form, closed-cell foam element resulting from the steps of heating a blend that comprises a nitrile polymer and polyvinyl chloride and a blowing agent in an amount to provide a composition that can be compression molded into a relatively dense spherical element, which element can then be subsequently post cured in the presence of air at an elevated temperature to effect a release of the entrained blowing agent and provide a resulting enlarged elastomeric element of low density and with unruptured cell walls.

It is also an advantageous feature of the use of the aforedescribed blend in providing a lightweight, closed-cell elastomeric foam to have a resulting self-skinning element. In other words, there will be a relatively dense, smooth coating around the resulting internal closed-cell foam portion of the element such that there is further resistance to abrasion as the elements will move in either a controlled or random motion within a scrubbing chamber. Even with the smooth surface for the element, it will be capable of having flexibility and resilience so as to permit deformation without cracking or breakage of the smooth surface. It appears that the smooth surface will provide an extended life for the use of the flexible resilient contact elements and minimize abrasive wear even in the presence of an entrained particulate matter with the gaseous stream or wherefrom contact with other elements in the mobile bed.

It is, however, another feature of the present invention to have relatively small closed-cells within the interior portion of the spheroidal contact element such that as the smooth self-skinning surface does wear away there will be an exposed surface from the small cells that will still permit a long wear life to any one element. Actually, in the event that the entire outer smooth surface is worn away and a particular contact element is undergoing a somewhat accelerated wear and terminal portion of useful life, there will still be a substantially non-absorbing surface with respect to the scrubbing liquid and the gradual wearing away of the entire spheroidal element will generally provide no harm whatever to the countercurrent gas-liquid operation. Actually, the presence of a few of the smaller sized contact elements resulting from a gradual wearing away of such elements may effect some advantage in the overall operation by reason of providing for varying sized elements within any one scrubber zone. It is not intended to limit the present invention to the formation of any one sized closed-cell within a spheroidal contact element; however, as heretofore set forth, it is believed preferable to have relatively small uniform cells throughout the entire cross-section such that if the smooth, self-skinning surface does wear away there is still provided a relatively smooth exposed surface as compared to a relatively rough, jagged surface that could be provided by large sized closed-cells which would be gradually exposed as there is gradual abrasion and surface wear for any one element.

As set forth in the aforementioned patents relating to scrubbing operations utilizing buoyant, mobile contact elements, such elements may vary in size, as for example from about $\frac{1}{2}$ inch to as large as 4 inches in diameter, however, it appears preferable that the spheres be in the 1 inch to 2 inch range, with a $1\frac{1}{2}$ inches nominal diameter, which is about the size of the well-known ping-pong ball, being used in various commercial operations. It has also been indicated that the balls will be lightweight or of low density so as to be readily buoyant in the upflowing gaseous stream for a gas-liquid operation. Typically, the $1\frac{1}{2}$ inches diameter elements will be in the 2 to 9 gram range and more generally in the 5 to 7 gram range. This weight will also apply to the present "solid" foam type of spheroidal type elements so that the resultant approximate $1\frac{1}{2}$ inches spheroidal elements will provide a density of about 10 to 20 pounds per cubic foot, or approximately 5 to 9.0 grams per element.

Various synthetic rubbers and vinyl resins may be found to provide an acceptable lightweight elastomeric material which could be generally acceptable for the present usage; however, it appears that the nitrile rubber and the polyvinyl chloride (PVC) blend are of particular advantage in effecting the highly desirable resulting self-skinning closed-cell foam elastomeric element. The amounts of the respective materials in the blend may vary, ranging for example from about 20% to about 60% PVC by weight of the nitrile polymer. It is not intended to limit the present invention to any one particular blend since the optimum amount may well depend upon a particular scrubber operation as to temperature conditions and/or the nature of the gas and liquid streams, etc.

At the present time, blends of nitrile rubber and PVC are commercially available, as for example, the Paracril and Paracril Ozo blends, being marketed by Uniroyal, Inc. In order to obtain the desired lightweight closed-cell foam for use in the present floating bed type of scrubbing operation, there is, of course, the additional usage of a blowing agent in combination with the nitrile rubber and PVC blend, with the amount of the blowing agent being regulated to produce a desired density for a resulting post cured spheroidal element. It is understood that the nitrile rubber in the blend will be present as a partially crossed-linked polymer which can be combined with the PVC and a blowing agent, as well as minor amounts of sulfur, accelerators, antioxidants, etc., such that the heating and compression molding of a small spheroidal element can result in a greatly enlarged spheroidal form element during a post curing stage in the presence of air and at an elevated temperature of the order of 300° F. to about 325° F., such that there can be further cross-linking or vulcanization of the nitrile rubber content to provide a stabilized, closed-cell foam elastomeric element.

The term "elastomeric" or "elastomer" as used herein relates to the property of having a high tensile strength and the ability to be stretched and returned to an original shape, i.e. as stated in an ASTM definition, an elastomer provides a "material which at room temperature can be stretched repeatedly to at last twice its original length and upon release of stress will return to its approximate original length".

EXAMPLE OF SPHEROID FABRICATION

As one example of spheroid-form element preparation in accordance with the present invention, approximately 115 parts of Paracril nitrile rubber-PVC blend, marketed as J-5685 by Uniroyal, Inc. was further blended with approximately 50 parts of carbon black, 35 parts of hydrated alumina, 10 parts of plasticizer (Santicizer 140), 25 parts of blowing agent (Celogen OT), 10 parts of paraffin wax, together with quite minor amounts of other additives including spider sulfur, zinc oxide and antimony oxide, etc.

This blend was heated to approximately 250° F. and compression molded into a mold-form providing for the formation of approximately $\frac{1}{2}$ inch diameter spherical elements, with the mold holding the blend for an approximate 4-minute cure period at 250° F. The resulting $\frac{1}{2}$ inch spheres, after removal from the mold-form, were post cured in a hot air stream for an approximate 8-minute period at a temperature range of from 300° F. to 325° F. The post curing operation resulted in the expansion of the $\frac{1}{2}$ inch spheres to the desired final size of approximately $1\frac{1}{2}$ inches diameter spheroidal-form, closed-cell foam elements (i.e., to an approximate 27 times greater volume). The resulting spheroids were extremely light, weighing approximately 7 grams each and had a smooth self-skinned type of surface. Also, the interior of the elements were such as to have quite small closed-cells to result in little, if any, liquid absorption during their usage in a countercurrent scrubbing operation. The spheroids were flexible, readily deformable, with a spongy feel, and could be stretched and elongated so as to well qualify as an elastomeric material.

EXAMPLE OF ELEMENT WEARABILITY

In order to provide a measure of abrasion resistance and length of life in a countercurrent scrubbing operation, a plurality of the hereinabove described type of foam spheroids were placed in a test chamber where an air stream provided their aeration and random motion in the presence of a descending "scrubbing" stream of water containing about 10% by weight of fly ash particles, so as to provide an abrasive type of test operation. The test chamber provided a spacing of about three feet between horizontal grids and the test zone was about one-third filled with the test spheres. The air flow rate was maintained at about 700 cubic feet per minute and the liquid rate at about 35 gallons per minute, while the internal temperature of the test zone was about 120° F. An inspection of the spheroidal elements after 960 hours of test chamber operation indicated from a visual inspection that there was very little wear, if any, for the self-skinned surfaces of the elements and, of course, no breakage of any of the foamed elastomeric elements.

I claim as my invention:

1. A method of contacting gas and liquid streams in a floating bed scrubber comprising countercurrently contacting said gas and liquid streams in the presence of an aerated mass of lightweight, mobile elements of spheroidal form, said mobile elements comprising closed-cell elastomeric foam formed from the molding and post curing of a blend consisting essentially of a nitrile polymer and polyvinyl chloride utilized in conjunction with a blowing agent, said closed-cell foam extending throughout the entire cross-section of said spheroidal elements, said mobile elements, after said post curing, having a relatively smooth, self-skinned surface, said mobile elements being of a resilience to preclude breakage thereof and of a softness and flexibility to effect self-cleaning characteristics, said mobile elements permitting uniform wear without breakage or liquid absorption during said contacting of said gas and liquid streams.

2. The improvement of claim 1 further characterized in that said lightweight, mobile elements result from the initial heating and compression molding of the blend to form relatively dense elements that are then subsequently heated and post cured to provide greatly enlarged elastomeric elements that have small closed-cells throughout the full cross-section thereof.

3. The improvement of claim 2 still further characterized in that said lightweight mobile elements result from an initial heating to provide a fluid material which may be compression molded to form the relatively dense elements and the latter are subsequently heated and post cured in the presence of air at a temperature of about 300° F. to about 325° F. to effect further cross-linking of the nitrile polymer and resulting enlarged spheroidal type elements with a closed-cell elastomeric foam composition.

4. The improvment of claim 1 further characterized in that the spheroidal form elements formed from said blend are initially compression molded into spherical form relatively dense elements with an approximate $\frac{1}{2}$ inch diameter and these relatively dense elements are subsequently heated at an elevated temperature in the presence of air to provide enlarged spheroidal-form elements that are of a low density of about 10 pounds to 20 pounds per cubic foot.

5. The improvement of claim 4 still further characterized in that the resulting post cured spheroidal elements result in a size enlargement of from about $\frac{1}{2}$ inch diameter to about $1\frac{1}{2}$ inches nominal diameter.

* * * * *